United States Patent [19]

O'Connell et al.

[11] Patent Number: 5,646,851
[45] Date of Patent: Jul. 8, 1997

[54] INTEGRATED ENGINE CONTROL

[75] Inventors: Glenn Patrick O'Connell, Troy; Larry Theodore Nitz, Rochester, both of Mich.

[73] Assignee: Saturn Corporation, Troy, Mich.

[21] Appl. No.: 496,993

[22] Filed: Jun. 30, 1995

[51] Int. Cl.⁶ .................................................. B60K 31/04
[52] U.S. Cl. .................................. 364/426.041; 123/350; 180/170; 364/431.04
[58] Field of Search ................... 364/426.041, 426.042, 364/426.045, 431.04, 431.051; 123/349, 350, 352, 361; 180/170, 178, 179

[56] References Cited

U.S. PATENT DOCUMENTS

| | | | |
|---|---|---|---|
| 4,907,155 | 3/1990 | Naitou et al. | 364/426.041 |
| 4,908,764 | 3/1990 | Etoh | 364/426.041 |
| 5,019,989 | 5/1991 | Ueda et al. | 364/431.052 |
| 5,073,865 | 12/1991 | Togai et al. | 364/431.051 |
| 5,137,104 | 8/1992 | Etoh | 180/179 |
| 5,151,861 | 9/1992 | Danno et al. | 364/431.04 X |
| 5,392,215 | 2/1995 | Morita | 364/426.042 |
| 5,508,925 | 4/1996 | Katayama et al. | 364/426.041 |

*Primary Examiner*—Collin W. Park
*Attorney, Agent, or Firm*—Michael J. Bridges

[57] ABSTRACT

Integration of vehicle speed and engine control functions in an automotive vehicle internal combustion engine controller compensates for mechanical lash between a cruise control actuator and an engine intake air valve without sacrificing control responsiveness through a parallel control approach, and improves overall control stability and controllability in the absence of mechanical lash through a selective control approach established to provide for smooth transitions between control modes. Improvement in the integration of deceleration fuel cutoff control with cruise control operates to prevent torque disturbances caused by control transitions in sensitive engine operating regions.

17 Claims, 7 Drawing Sheets

INTEGRATED ENGINE CONTROL

FIELD OF THE INVENTION

This invention relates to control of automotive internal combustion engines and, more particularly, to integrated vehicle speed and engine control functions.

BACKGROUND OF THE INVENTION

Automotive cruise control automatically controls actual automotive vehicle speed to a target speed, such as may be set by a vehicle operator. Such cruise control may influence engine inlet air or fuel in parallel with other control activities, such as standard engine control activities. Typical engine control applications include a throttle follower mechanism, also commonly referred to as a dashpot mechanism, to improve engine inlet air control performance by damping change in engine intake manifold pressure under certain transient engine operating conditions. The damping is commonly provided through control of an engine intake air bypass valve, such as an idle air control valve, in proportion to the operator-commanded intake air (throttle) valve position. The throttle follower mechanism is typically only active for certain small intake air (throttle) valve openings and, when active, increases the engine intake air gain for a given change in throttle position. The increase in engine intake air gain reduces control stability, and transitions into and out of the limited range of activation of the throttle follower can produce significant engine control perturbations that may be perceptible to the vehicle operator, and that may reflect poorly on engine or vehicle stability.

Furthermore, in parallel cruise control systems in which a cruise control actuator provides for engine intake air valve position variation in parallel to position variation by an accelerator means, such as an accelerator pedal, an amount of cruise control actuator travel may be provided below the throttle valve fully closed position. The amount of cruise control travel below the throttle valve fully closed position is commonly referred to as the cruise control mechanical lash, which must be taken up before the cruise control actuator can impact throttle valve position. For cruise control maneuvers starting from a fully released (or nearly fully released) cruise control actuator position, the time required to take up the mechanical lash can result in increased vehicle speed error and in reduced cruise control responsiveness.

Still further, during severe engine speed or vehicle speed reduction periods characterized by engine control operation in the generally understood deceleration fuel cutoff mode, if cruise control is active and the engine is within an operating range associated with a high sensitivity to fuel command changes, entry into or exit from the deceleration fuel cutoff mode of operation can result in significant and undesirable engine output torque disturbances, which may reflect negatively on engine or vehicle stability.

It would therefore be desirable to provide an improved integration of the parallel functions of cruise control, general engine control, throttle follower control and deceleration fuel cutoff control.

SUMMARY OF THE INVENTION

The present invention provides a desirable improvement in the integration of cruise control and engine control functions including vehicle speed control, deceleration fuel cutoff control, engine idle air control and throttle follower control in an automotive control system including a cruise control actuator having significant cruise control mechanical lash. More specifically, for cruise control in a first operating region characterized by cruise control mechanical lash, both the cruise control actuator and the idle air control valve are actuated in response to a desired change in engine output torque. Movement of the cruise control actuator in this region operates to take up cruise control mechanical lash and movement of the idle air control valve operates to vary engine output torque to responsively satisfy the cruise control command. For cruise control in a second operating region in which the cruise control mechanical lash has been substantially taken up, the two actuators will no longer operate together, but rather only one or the other will operate to satisfy the cruise control command. More specifically, if responding to the cruise control command using the idle air control valve alone would drive the idle air control valve position closer to but not exceeding an engine control throttle follower valve position, such as may be maintained by the engine control as a function of throttle valve position, then the cruise control command will be responded to using the idle air control valve alone. Otherwise, the cruise control command will be resolved using the cruise control actuator alone.

Such selective control of either or both the cruise control actuator and the idle air control (bypass) valve to vary engine output torque in response to the cruise control command significantly and controllably increases cruise control responsiveness in the operating region characterized by cruise control mechanical lash and reduces the gain increase associated with throttle follower operation. Once cruise control mechanical lash is taken up, the idle air control valve position is actuated in response to commands that will tend to drive it toward but not beyond a conventional throttle follower position, to efficiently and smoothly drive the idle air control valve into position to deliver an effective throttle follower function. For decreases in desired engine intake air valve position, the idle air control valve position may then change in accord with the normal throttle follower function, providing for well-established throttle follower benefits.

In yet a further aspect of this invention, the deceleration fuel cutoff (DFCO) control function is coordinated with the cruise control function to make transitions into and output of DFCO less disruptive. More specifically, DFCO is disabled whenever the vehicle is operating in the cruise control "cruise" state characterized by cruise control regulating vehicle speed within a small overspeed error. Furthermore, the DFCO function is disabled if the idle air control valve position in cruise control is not at a predetermined minimum limit position. Still further, if cruise control is in an override state characterized by a significant overspeed error, DFCO is not enabled until after a delay period sufficient in length to determine whether DFCO is required to control speed. Finally, DFCO is disengaged when an increase in engine torque output is requested through a cruise control maneuver. The manner of disengagement is selected from a plurality of options, based on which of the plurality provides for the smallest engine output torque perturbation.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
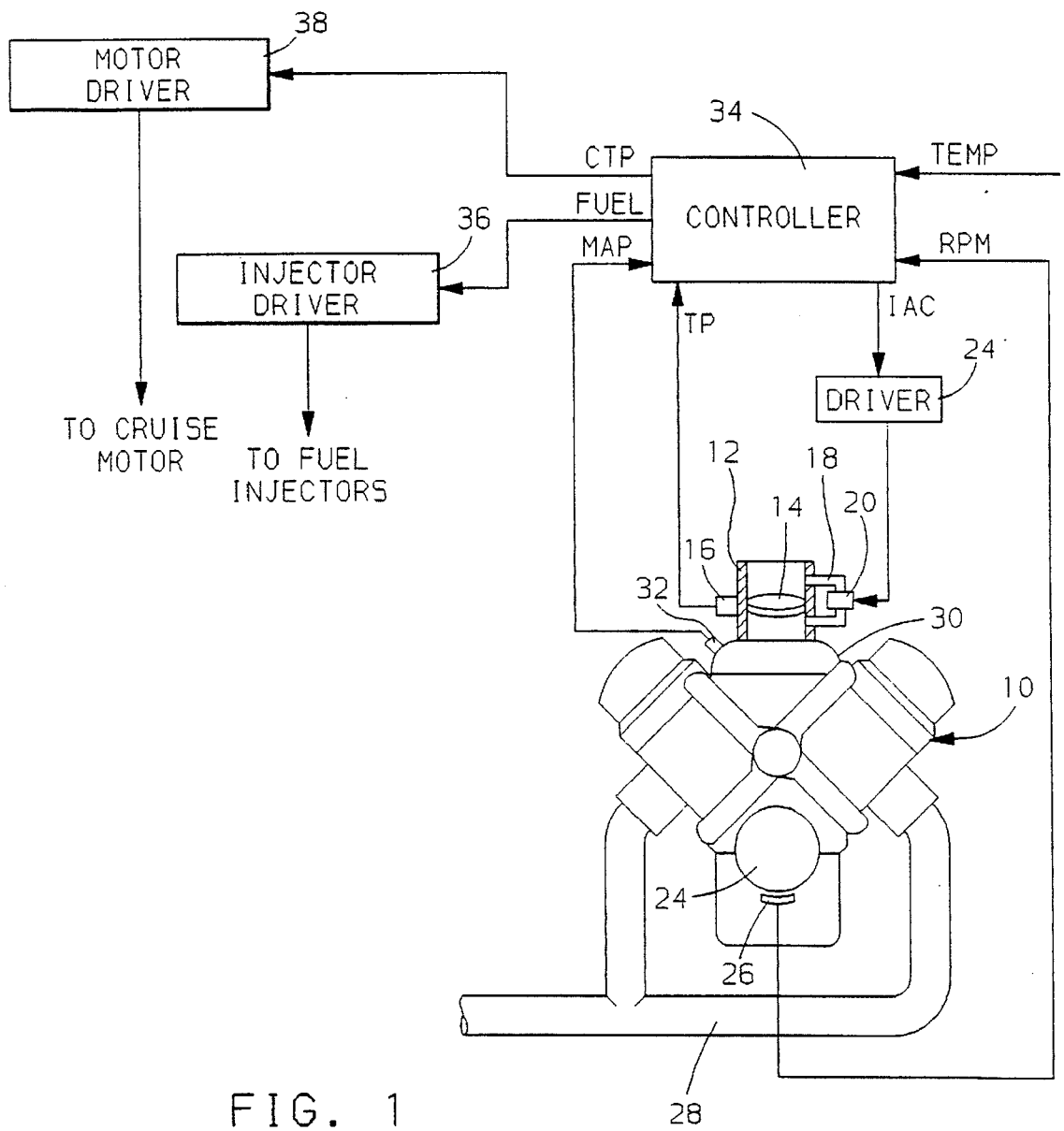
FIG. 1 is a general schematic diagram of the engine control hardware for carrying out the functions of this embodiment.

Referring to FIG. 1, intake air is metered through throttle bore 12 to internal combustion engine 10 through positioning of intake air valve 14, such as a conventional butterfly or rotary valve, the rotational position of which is transduced by conventional rotary position sensor 16 which outputs a signal TP indicating the rotational displacement of the valve 14 away from an initial position. An idle air conduit 18 is provided between the atmosphere and engine intake air manifold 30 to provide for engine intake air control substantially independent of the intake air valve 14. Idle air control valve 20, such as a conventional solenoid valve is provided in the idle air conduit 18 to control the restrictiveness of the conduit 18. The position of the valve 20 is controlled in accord with a position command received from a conventional solenoid driver 24, such as a drive current command applied at a level corresponding to the commanded degree of displacement of the valve away from a known rest position. The intake air received through the bore 12 and through the conduit 18 is received in the engine intake manifold 30 and combined with an injected fuel quantity for delivery into the engine cylinders (not shown). The intake air pressure in the intake manifold 30 is transduced by conventional pressure transducer 32 which provides an output signal MAP indicating the absolute air pressure in the manifold 30. Engine output shaft 24 is rotationally driven through forces generated by igniting the air/fuel mixture in the engine cylinders. Position sensor 26, such as a conventional Hall effect or variable reluctance sensor, senses passage of spaced teeth or notches about the circumference of the shaft 24 and outputs signal RPM indicating such passage, for use in determining relative engine angular position within an engine cycle and for use in determining the rate of shaft rotation. The combustion gasses generated through ignition of the air/fuel mixture in the engine cylinders are guided away from the engine cylinders via exhaust gas conduit 28.

Controller 34, such as a conventional single-chip microcontroller includes such conventionally known elements as a read only memory unit, random access memory unit, central processing unit including arithmetic logic unit and control circuitry, and input/output circuitry for receiving and transmitting signals to and from the controller 34. The controller operates to receive electrical input signals including the described signals RPM, MAP, and TP, and further including signal TEMP indicating engine coolant temperature from a conventional temperature sensor (not shown) disposed in an engine coolant circulation path (not shown). Other input signals may be further provided in accord with conventional understanding of the art.

Figure 2:
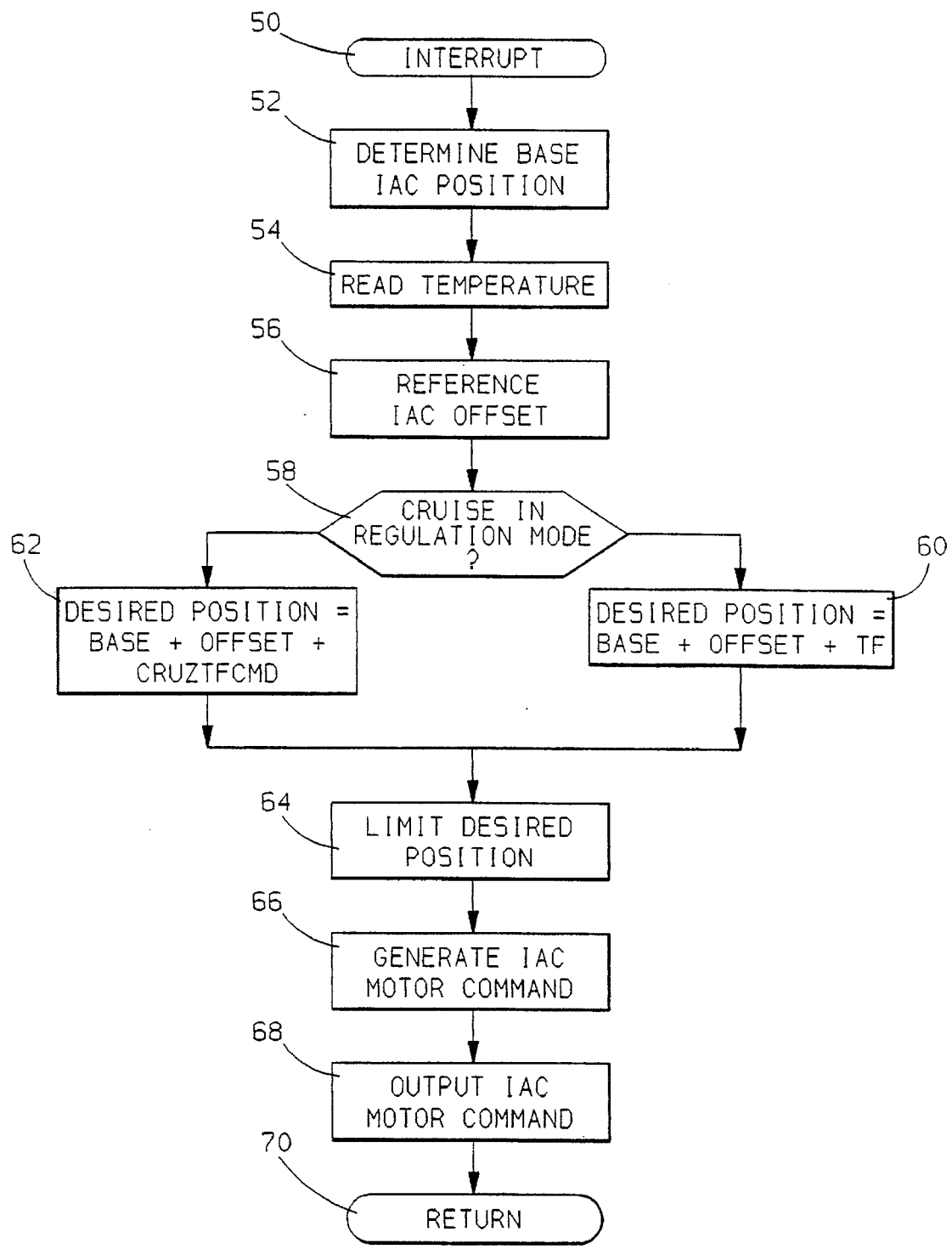
FIGS. 2–5 are computer flow diagrams illustrating the flow of operations of the hardware of FIG. 1 for carrying out the preferred embodiment of this invention.

The controller further functions to generate a series of control command signals through execution of a plurality of control routines stored, for example, in controller read only memory. More specifically, a control command FUEL is issued from the controller 34 to a series of conventional injector drivers shown generally as box 36. FUEL generally indicates a desired cylinder fuel injection quantity in the form of a desired amount of fuel injector opening time for allowing a pulse of pressurized fuel to engine the engine. The injector drivers 36 may convert the command FUEL to a pulse width of appropriate duration and may output the pulse width in a timed manner to a next active fuel injector, such as the injector corresponding to the engine cylinder about to undergo its intake valve opening event. The timing of the issuance of the pulse width corresponds a desired amount of residence time of the delivered fuel quantity in the engine prior to admission into the next active engine cylinder, such as described in the U.S. Pat. No. 5,537,982, assigned to the assignee of this application. The controller further issues the command IAC to the described idle air solenoid driver 24 for positioning of the idle air bypass valve 20, as will be further described. Still further, in this embodiment, the controller 34 issues cruise control throttle position command CTP to a cruise control actuator driver 38, such as a conventional motor driver for driving a conventional cruise control actuator mechanically operating to supplement operator commanded inlet air valve 14 position in accord with generally understood cruise control operations. For example, the cruise control actuator may be linked through a cable pulley arrangement to the intake air valve 14 to modulate the valve position in accord with a speed difference between actual vehicle speed and an operator set speed, to automatically drive the engine operating point in direction to minimize the speed difference while the operator has relinquished vehicle speed control authority to the vehicle cruise control system. The command CTP may be issued by the controller in the form of a desired cruise control motor position which may be converted by the motor driver into a drive current to be applied to the cruise control motor. The plurality of operations carried out by the controller 34 for providing engine control operations including cruise control and idle air control operations in accord with this embodiment include the operations illustrated in a step-by-step manner through the routine of FIGS. 2–6. Further operations may be included with those of FIGS. 2–6 through the exercise of ordinary skill in the art to provide for engine control, diagnostic and maintenance operations. Specifically, the operations illustrated as the routine of FIG. 2 are executed in a step by step manner approximately every 12.5 milliseconds while the controller 34 of FIG. 1 is operating. For example, a standard timer interrupt may be configured to occur at least every 12.5 milliseconds and to execute the operations of FIG. 2 about every 12.5 milliseconds, starting at a step 50 and proceeding to a next step 52 to determine a base IAC motor position corresponding to an initial position of the IAC motor. For example, the base position may be an open loop stored position of the IAC motor generated by storing a startup position and updating the stored initial position by increasing it by the amount of any positive position change commands and decreasing it by the amount of any negative position change commands.

After determining the base IAC motor position, the current engine coolant temperature is determined by reading input signal TEMP at a next step 54. The TEMP value is next applied to reference a IAC position offset at a next step 56. The offset is determined as the amount of change in the restrictiveness of the IAC conduit 18 of FIG. 1 necessary to compensate for engine temperature changes as indicated by changes in TEMP, to provide for satisfactory IAC control performance. The relationship between TEMP and the offset may be determined during a conventional calibration process for the system to which the IAC control is applied to provide IAC control that is substantially insensitive to change in engine temperature, as is generally understood in the art.

After determining the offset, a decision at step 58 is made as to whether the cruise control is currently in regulation mode characterized by automatic regulation of vehicle speed. If in regulation mode, cruise control compensation is provided in accord with this invention by regulating IAC motor position not only to provide for engine torque damping, but also for cruise control mechanical lash compensation and for improvement in control stability at low engine operating regions indicated by low intake air valve position. If not in regulation mode, conventional throttle follower TF commands are provided for IAC motor positioning. Specifically at the step 58, if cruise control is determined to be in regulation mode, a step 62 is executed to determine a desired IAC motor position as the sum of the base position, the offset determined at the step 56 and the current cruise control throttle follower command CRUZTFCMD., which is determined through the operations of the routines illustrated in FIGS. 4 and 5, to be described.

Alternatively, if cruise control is not in regulation mode at the step 58, a step 60 is executed to determine the desired IAC motor position as the sum of the base position, the offset, and the conventional throttle follower command TF, to provide for the conventionally-understood throttle follower benefit of damping change in intake air manifold pressure, such as during severe engine lift-off transient conditions. After determining the current IAC motor desired position at a one of the steps 60 or 62, the position is limited at a next step 64 in accord with a predetermined limit value set up to limit the authority of the IAC control. The authority of the IAC may be limited in accord with physical limitations of the valve 22 of FIG. 1, or in accord with electronics limitations, such as limitations in the range of digital to analog converter hardware, or may be limited to constrain the influence of idle air on engine operation to engine operating ranges in which idle air can provide some control benefit, as is generally understood in the art. In any case, the desired IAC motor position will be limited to the limit value at the step 64, after which an IAC motor command is generated at a next step 66 as the motor command required to efficiently move the IAC motor to the desired position determined at the step 60 or the step 62. The command may be generated as an appropriate level of current or voltage or as an appropriate drive duty cycle needed to provide for the positioning of the IAC motor 20 of FIG. 1.

The generated command is next output to the motor driver 24 of FIG. 1 at a step 68 by issuing it as output signal IAC as described. The motor driver 24 will then convert the command to a drive signal, such as a voltage or current level or a pulse width modulated duty cycle command, depending on which of a variety of conventional motors is used to position the idle air bypass valve 22 of FIG. 1. The converted command will be applied to position the IAC motor accordingly, as is generally understood in the art. After positioning the IAC motor, a step 70 is executed to return to any controller operations that may have been temporarily suspended to allow for the carrying out of the operations of FIG. 2. The routine of FIG. 2 is then repeated at an iteration rate of about 12.5 milliseconds in the manner described, to provide for IAC motor positioning in accord with either cruise control throttle follower or conventional engine throttle follower operations, in accord with this embodiment.

Figure 3:
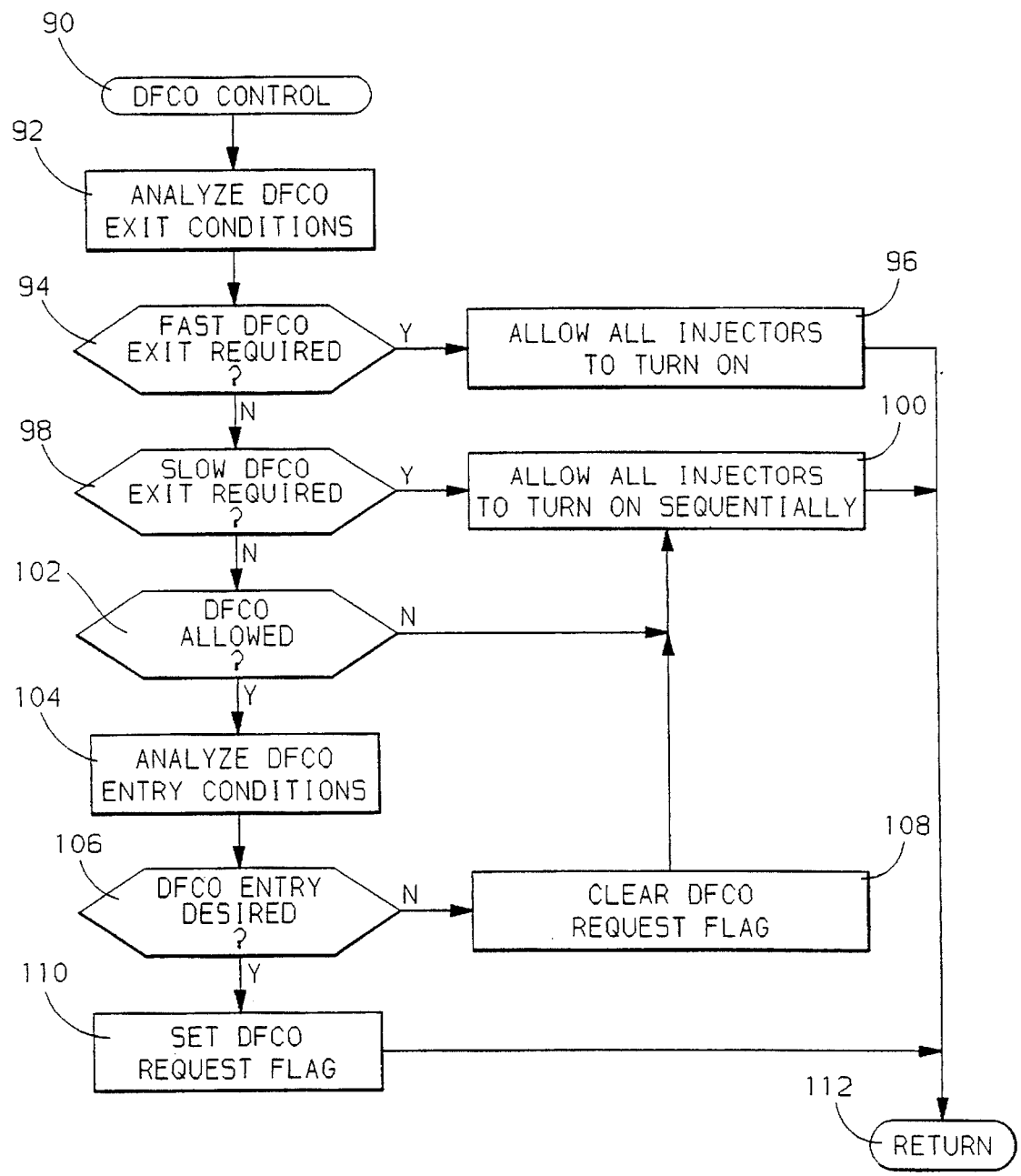

Referring to FIG. 3, deceleration fuel cutoff DFCO control operations are illustrated for integrating DFCO control with the cruise control operations of this embodiment. The routine of FIG. 3 is executed in this embodiment about every 12.5 milliseconds while deceleration fuel cutoff is active, such as during a significant deceleration of the vehicle, to improve fuel economy by temporarily interrupting or at least significantly reducing the supply of fuel to the engine under certain deceleration conditions, as is well-established in the art. The 12.5 millisecond iteration rate may be provided for through a conventional timer interrupt set up to occur at least once for every 12.5 milliseconds of controller operation while deceleration fuel cutoff is active. Upon occurrence of the interrupt, the routine of FIG. 3 is entered starting at a step 90.

The routine proceeds to a next step 92 to analyze DFCO entry and exit conditions. Under certain conditions, called fast exit conditions, DFCO should be exited rapidly to provide for desirable vehicle control. Under other conditions, called slow exit or entry conditions, a gradual exit from or entry into DFCO is preferred, to allow a gradual resumption or a gradual discontinuing of engine fueling. Such conditions are examined at the step 92 and may include any vehicle operating conditions under which conventional DFCO is rapidly discontinued or slowly entered or exited. For example, a fast DFCO exit may be desired if a MAP sensor 32 (FIG. 1) error or a TP sensor (16 (FIG. 1) error are present in the system, if the engine is running at a relatively cold temperature at which DFCO is generally known to be undesirable, if the vehicle transmission is in park, neutral or first gear, or if idle air control is governing engine inlet air rate. A slow exit may be desired, for example, if the intake air valve position TP is detected to be increasing, indicating a torque increase command, if cruise control is actively regulating vehicle speed and requesting an increasing in engine output torque, or if intake air manifold absolute pressure has increased above a calibrated threshold pressure value indicating a reduced engine operating level. After examining such conditions at the step 92 of FIG. 3, a determination is made at a next step 94 of whether a fast exit is required from DFCO, based on the status of the conditions examined at the described step 92. If a fast exit is required, a next step 96 is executed to enable any disabled fuel injectors to rapidly resume normal delivery of fuel to the engine 10. However, if a fast exit is not required, a next step 98 is executed to determine if the examined conditions indicate that a slow exit from DFCO is required. If a slow exit is required, a next step 100 is carried out to allow for a one-by-one resumption of operation of any disabled fuel injectors at a predetermined rate of resumption, such as may be determined in a calibration process to provide for a smooth resumption of normal engine fueling.

If a slow exit from DFCO is determined to not be required, a next step 102 is executed to determine if DFCO is currently allowed. DFCO is allowed when engine control operations indicate an appropriate deceleration conditions under which conventional DFCO operations would yield a fuel economy benefit without a significant negative effect on vehicle driveability or emissions. If the DFCO is allowed as determined at the step 102, a next step 104 is executed to analyze DFCO entry conditions which are, in this embodiment, required to be present in order to allow DFCO to operate. Such entry conditions include examination of the cruise control state, and examination of any decay in cruise control throttle follower position. Such conditions provide for a significant control improvement in the coordination of cruise control functions and DFCO functions, to avoid, for example, perceptible changes in engine torque while both DFCO and cruise control are active.

After examining the entry conditions at the step 104, a step 106 is executed to determined if DFCO entry is desired based on the examined conditions. In this embodiment, and in accord with the DFCO and cruise control improvements offered through the present invention, DFCO entry is not permitted if cruise control is regulating vehicle speed in a "cruise" state characterized by a small vehicle overspeed error, or if the cruise control throttle follower command is greater than a calibrated minimum limit value. Further, if the cruise control is in an "override" state characterized by a significant overspeed error, then DFCO will not be permitted until a predetermined time delay has elapsed, such as a delay of about five seconds. Accordingly, if the "cruise" state is active or if the "override" state is active and the direction of any change in CRUZTFCMD is increasing and the described time delay has not elapsed since the "override" state was first detected at the step 104 of FIG. 3, then DFCO entry is not desired, and the routine moves to a step 108 to clear the DFCO request flag to prevent DFCO operation until the entry conditions are met while DFCO is allowed. Alternatively, if the conditions are met as determined at the step 106 such that DFCO entry is desired, a next step 110 is executed to at which the DFCO request flag is set indicating that DFCO is to be entered to begin a gradual disabling of engine fueling in accord with conventional DFCO control.

The DFCO request flag of the present embodiment may be used by any convention deceleration fuel cutoff routine to provide for conventional fuel cutoff under vehicle or engine deceleration conditions. Generally, if such conventional routine desires to initiate DFCO operations, the DFCO allowed flag analyzed at the described step 102 is set. Then, if DFCO is to be allowed in accord with the DFCO-cruise control integration features of the present invention, the DFCO request flag is set. Otherwise, the DFCO request flag is cleared. The DFCO request flag is then polled by the conventional DFCO routine and fueling is disabled gradually to the engine cylinders under the conventional DFCO operations only if DFCO request flag is set. Returning to FIG. 3, after setting the DFCO request flag at the step 110, a next step 112 is executed to return to any operations that were ongoing and perhaps suspended to allow for execution of the routine of FIG. 3. If DFCO was determined to not be allowed at the step 102, or if DPCO entry was determined to not be desired at the step 110, or further if the slow exit from DFCO was required at the step 98, a step 100 is executed to allow for slow exit from DFCO, for example by commanding a sequential turning on of any fuel injectors of the engine 10 of FIG. 1 that may have previously been 20 disabled under the DFCO operations, with a predetermined time delay between each re-enabling of the individual injectors, as is conventionally understood in the engine fuel control art. After allowing the injectors to be sequentially re-enabled, the described step 112 is executed. Returning to the step 94, if a fast DFCO exit is required, a next step 96 is executed at which time all fuel injectors may be re-enabled to function in their conventional manner of delivering scheduled fuel quantities of the engine cylinders. Following this rapid exit from DFCO, the described step 112 is executed to return to any previously operating yet temporarily suspended functions or operations.

Figure 4A:
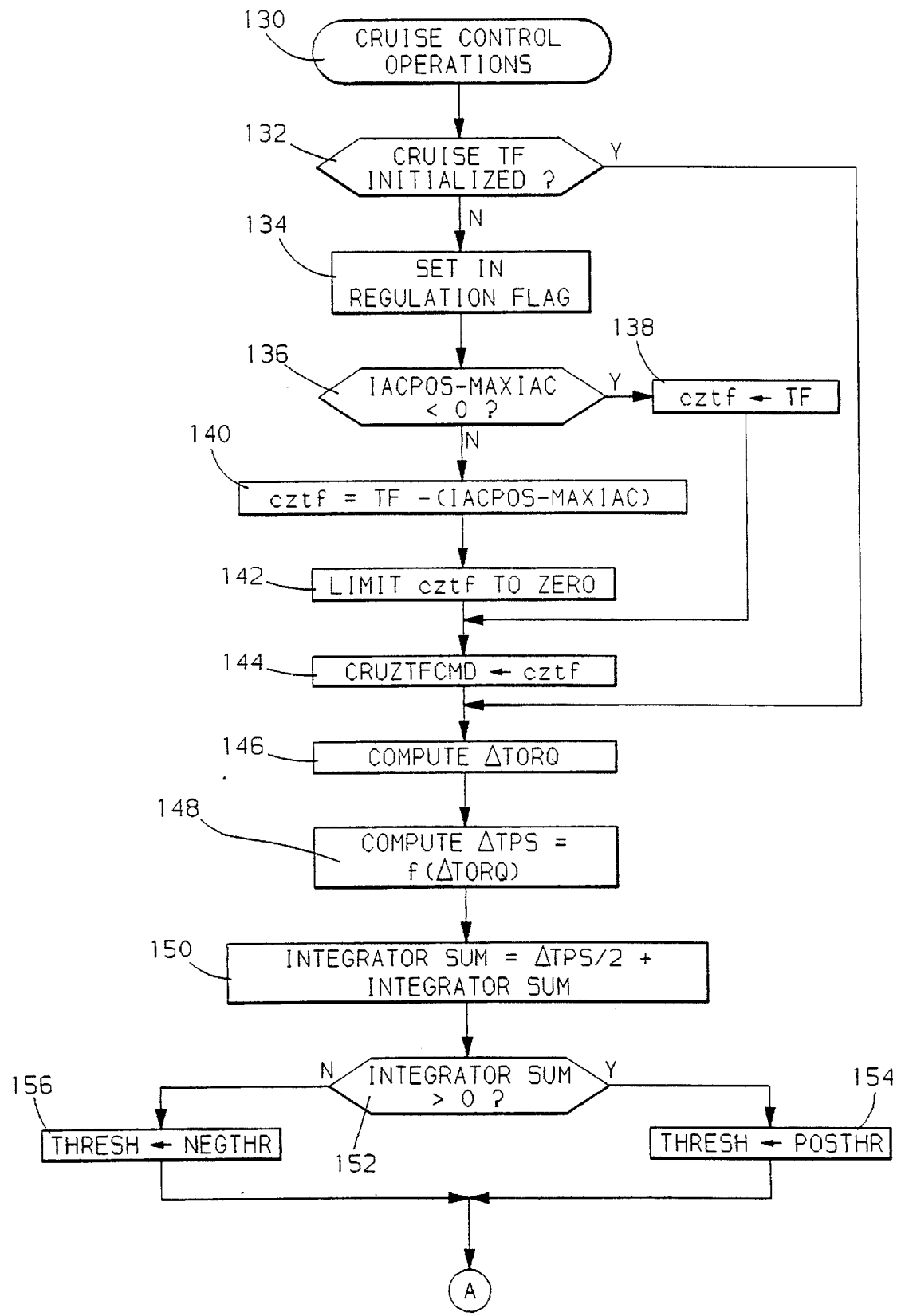
Figure 4B:
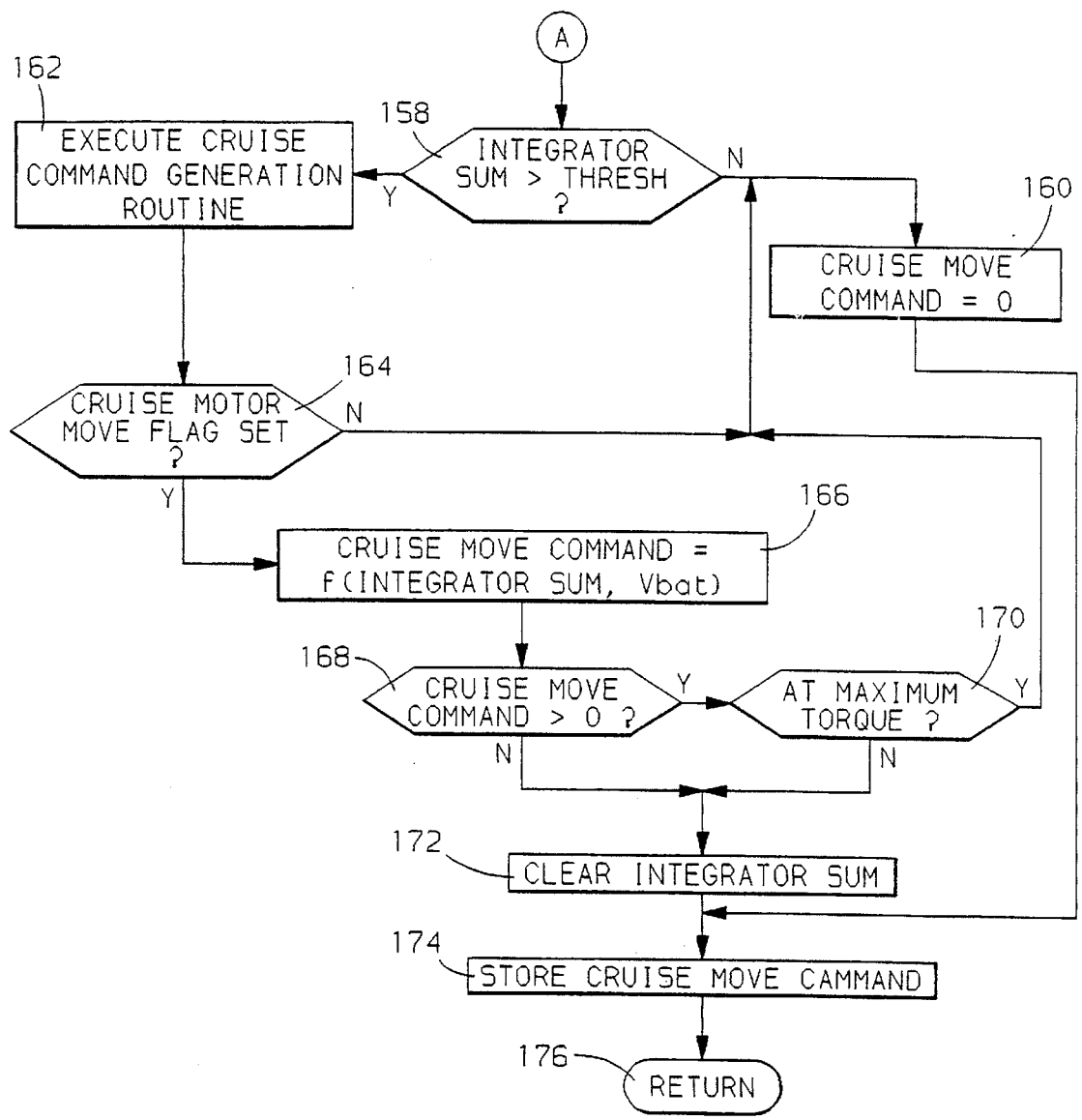
Figure 5:
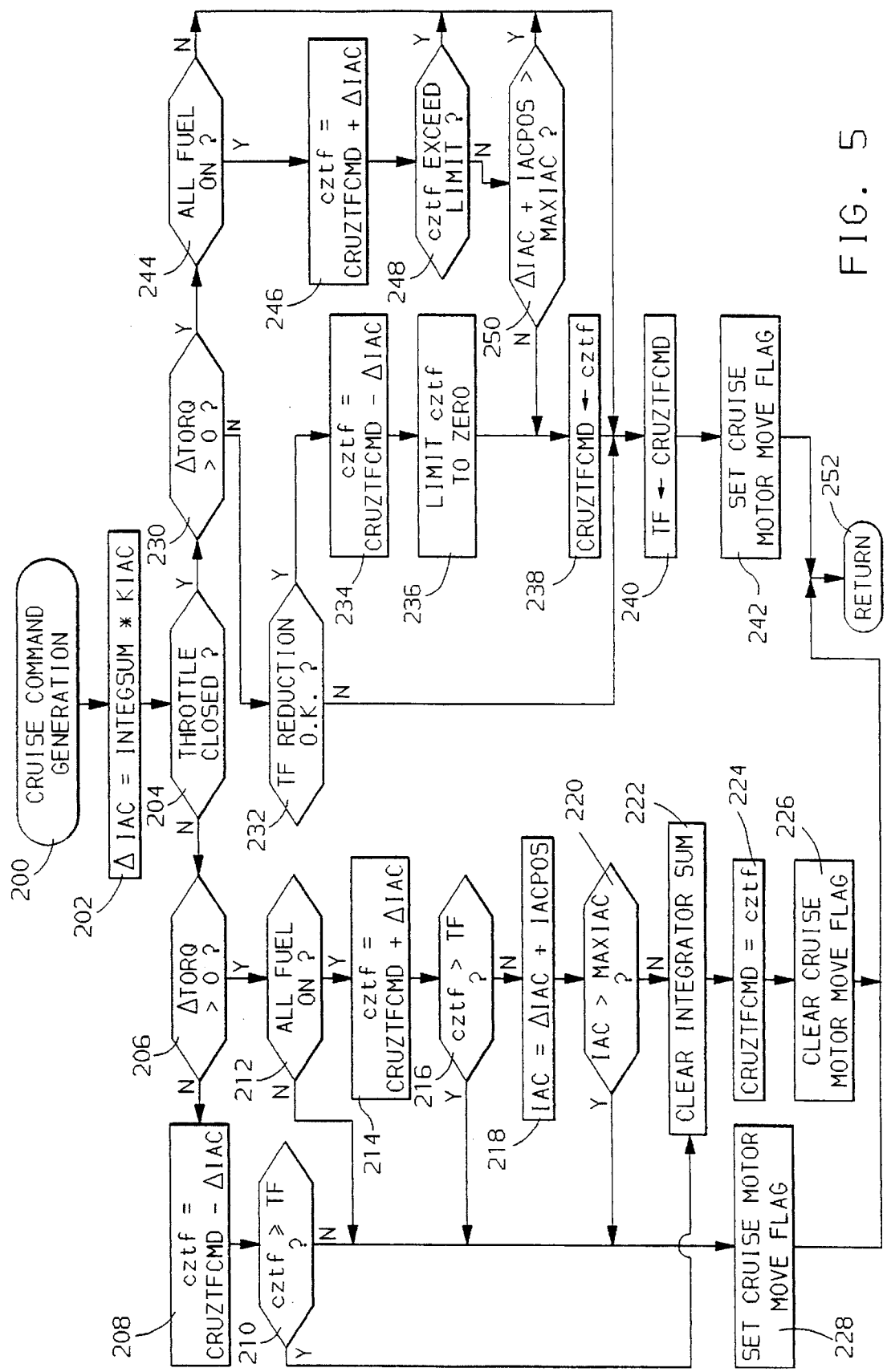

Referring to FIGS. 4a and 4b, cruise control operations are detailed in a step by step manner to be executed approximately every 100 milliseconds while the controller 34 of FIG. 1 is operating, to carry out cruise control functions beginning at a step 130 and proceeding to a next step 132 at which a stored flag indicating cruise control throttle follower initialization is polled to determine if cruise control throttle follower has been initialized. In this embodiment, cruise control throttle follower is initialized to the starting position of the conventional engine throttle follower TF and limited to a reasonable idle air control motor position range. The cruise control throttle follower then is controlled to improve system controllability and stability, take up cruise control mechanical lash, and track the conventional engine throttle follower provided for the generally understood engine intake air pressure damping, so as to minimize its impact on the overall engine control strategy.

Returning to FIG. 4a, to initialize the cruise control throttle follower, a cruise control in regulation flag is first set at a step 134 indicating the cruise control is regulating vehicle speed. Next, the difference between the position of the idle air control motor IACPOS and its maximum position is compared to zero. If the difference is less than zero, the current IAC position is not at its maximum and therefore need not be limited before being used in the present initialization process, and the routine moves to a next step 138 to initialize the cruise control throttle follower position to the current position of the engine throttle follower position TF. Returning to the step 136, if the difference is greater than zero, the IAC motor is at or beyond its maximum position, and the routine moves to a next step 140 to set cruise control throttle follower command to the current engine throttle follower command reduced in magnitude by the amount that the IAC motor exceeds its maximum position. cztf is next limited to zero at a step 142. Next, or following the described step 138, the current cruise control throttle follower command CRUZTFCMD is set to the initialized value of cztf, to complete the initialization of the cruise control throttle follower.

After completing the initialization process, or if the initialization was determined at the step 132 to have already been carried out, a next step 144 is executed at which a $\Delta$TORQUE term is computed, representing the desired change in engine output torque needed to efficiently drive the engine speed error toward zero. The engine speed error is the difference between the operator set cruise control speed and the actual vehicle speed. The $\Delta$Torque term may be computed by referencing a torque change value from a conventional lookup table stored in read only memory of controller 34 of FIG. 1 representing a calibrated relationship between speed error and the change in engine output torque needed to efficiently drive the error toward zero in a reasonable time with minimum speed overshoot. The calibration may be specific for the automotive vehicle to which the cruise control system of this embodiment is applied.

After computing the $\Delta$Torque term at the step 146, a $\Delta$TPS term is calculated at a nest step 148 as a predetermined stored function of the computed $\Delta$Torque term, representing the change in intake valve 14 (FIG. 1) position needed to accomplish the desired change in engine torque represented by the term $\Delta$Torque. For example, each change in intake air valve 14 position corresponds, for a given engine load, to a change in the engine output torque. The relationship between such valve position changes and engine output torque may be established through a conventional calibration process and stored in the form of a conventional lookup table in read only memory of controller 34 of FIG. 1. When a $\Delta$Torque value is determined at the step 146 then, a corresponding $\Delta$TPS value may be referenced from the stored lookup table through any generally known process for retrieving values from stored lookup tables.

After retrieving the $\Delta$TPS value at the step 148, an integrator sum is increased at a next step 150 by half of the value of $\Delta$TPS. The integrator sum is to be used for commanding a change in either the cruise control actuator or the IAC motor, as will be described.

Next, the integrator sum is compared to zero at a step 152. If the integrator sum is greater than zero, indicating the intake air valve (throttle) is opening (increasing in position), a next step 154 is executed to set a threshold value THRESH to a predetermined value POSTHR. If the integrator sum is less than or equal to zero at the step 152, indicating that the intake air valve is holding its position or is closing (decreasing in position), the value THRESH is set to a predetermined value NEGTHR. The threshold values POSTHR and NEGTHR have a common magnitude representing about one third of one percent of the overall range of travel of the intake air valve of the present embodiment, but the two threshold values are applied to integrator sums of opposite sign to allow greater flexibility in calibrating independently the threshold for opening and the threshold for closing throttle.

After setting THRESH to the appropriate threshold value at either step 154 or step 156, the integrator sum is compared to the value THRESH at a next step 158. If the integrator sum exceeds the THRESH value, movement of either the cruise control actuator or the IAC motor or both may be required to resolve any current vehicle speed error, and such movement is provided for in the operations of steps 162–174. Otherwise, no movement is required, and the cruise move command is cleared at a next step 160.

Returning to the series of steps 162–174, to provide for movement of the cruise control actuator or the IAC motor, or both, a routine is first initiated at the step 162 to generate a cruise command. The routine comprises the series of operations illustrated as FIG. 5 which generally determine whether the cruise control actuator or the IAC motor or both are needed in accord with this invention to resolve the current vehicle speed error. The routine of FIG. 5, when initiated at the step 162 of FIG. 4b, begins operations begins operation at a first step 200 and proceeds to a step 202 to determine a $\Delta$IAC value as the product of the integrator sum and a predetermined scalar gain factor KIAC. The $\Delta$IAC value is generally the required change in IAC position to accomplish the desired engine output torque change. After determining $\Delta$IAC, the signal TP is examined at a next step 204 to determine if the intake air valve (also called the throttle valve) is currently closed, corresponding to a position substantially at zero valve displacement away from a rest position at which no air passes by the valve 14. If the intake air valve is closed, both the IAC motor and the cruise control actuator will be used to resolve the speed error in accord with the present invention, to take up cruise mechanical lash and yet provide for a responsive vehicle speed error resolution. Such is provided through execution of the series of operations of steps 230–242, beginning at a step 230 at which the direction of the motion is determined by comparing $\Delta$TORQ to zero, wherein $\Delta$TORQ represents the change in engine output torque required to drive the speed error efficiently toward zero, as described in the operation of step 146 of FIG. 4a.

If $\Delta$TORQ is less than zero, a closing of the IAC valve is required and the routine moves to a step 232 to determine whether reduction in the IAC valve position is currently being allowed by general engine control or diagnostics operations, indicated in this embodiment by a TF reduction flag being set. IF the flag is set, the reduction in IAC position to yield the reduction in engine output torque is provided for by proceeding to a next step 234 at which the cruise throttle follower command is set to the its current value less the $\Delta$IAC value to provide the necessary IAC command reduction. the command cztf is next limited to zero at a step 236 to prevent a driving of the IAC motor to a position it is physically incapable of reaching. The cruise throttle follower output command CRUZTFCMD is next assigned the command values of cztf a step 238, and the conventional engine throttle follower value which is used t monitor the throttle follower position is updated in accord with the command cztf at a next step 240. To clear the cruise control actuator for movement in parallel with the IAC motor to resolve the speed error, a cruise motor move flag is next set at a step 242, after which the routine moves to a step 252 to return to the operations of FIG. 4b, resuming the operations thereof at the next step 164, to be described.

Returning to step 232, if the reduction in the throttle follower command is currently not permitted, cztf is not updated, and the steps 240 and 242 are carried out without an updated cruise control throttle follower command. Returning to the step 230, if the $\Delta$TORQ value is greater than zero, an opening of the intake air valve 14 through cruise actuator movement and of the IAC valve 22 (FIG. 1) is required, and a next step 244 is executed to determine if the torque increase may be provided through resumption of any ongoing fuel cutoff operations. For example, if any engine cylinder is currently not being fueled under an ongoing fuel cutoff operation, it is preferred in the present embodiment to allow an exit of fuel cutoff operations to resolve the needed torque increase rather than increasing intake air rate through cruise actuator or IAC motor movement. Accordingly, if all fuel is not on at the step 244, the command cztf is not updated, and the described steps 240 and 242 are executed using any prior determined cruise throttle follower command, and then the described step 252 is executed. However, if all fuel is on at the step 244, the command cztf is updated at a next step 246 as the sum of the current command CRUZTFCMD and the $\Delta$IAC value. The updated command cztf is next compared to a calibrated limit value at a step 248. If cztf exceeds the limit value, the command is not output to the IAC motor by avoiding the described step 238 and moving directly to the described step 240 to store a prior determined cruise throttle follower command as the engine throttle follower value TF. However, if the command cztf is within the limit, indicating that further IAC opening will still be useful, for example to provide for throttle follower operations or to compensate for cruise control mechanical lash, the overall intended IAC position including the sum of the desired change in IAC position represented by the value $\Delta$IAC and the current actual IAC valve position represented by the value IACPOS, is compared to the maximum realizable IAC position, a predetermined measured value, stored in read only memory as MAXIAC, at a next step 250. If the intended position exceeds the maximum realizable position, the updating of the output command CRUZTFCMD is avoided by moving directly to the step 240 to store a prior determined cruise throttle follower values as TF, as described.

Returning to step 204, if the intake air valve (throttle) is not closed, the parallel IAC and cruise actuator positioning for cruise control mechanical lash compensation in accord with this invention is not provided, by moving to the steps 206–228, to move either the cruise control actuator or the IAC motor, but not both, in accord with an aspect of the present invention. Specifically, the routine moves from the step 204 to a step 206 to determine if the $\Delta$TORQ value is grater than zero. IF $\Delta$TORQ is greater than zero at the step 206, a torque increase is required and the routine moves to a next step 212 to determine if all fuel injectors are currently enabled. If any injector is disabled, intake air increase as requested by the positive $\Delta$TORQ value will not be provided. Rather, the torque increase may first be provided through an enabling of all injectors as described at the step 244. Accordingly, if all injectors are determined to not be on at the step 212, movement of the IAC motor is avoided by moving directly to a step 228, to set a cruise motor move flag to enable only cruise motor movement. The IAC actuator will only move in response to a change in the move command, which is not provided unless all fuel injectors are turned on. After setting the cruise motor move flag, the described step 252 is executed to return to the routine of FIG. 4b.

Returning to step 212, if all injectors are currently turned on, the cruise throttle follower command is generated as a sum of the current command CRUZTFCMD and the desired change ΔIAC. If this generated throttle follower command exceeds the conventional engine throttle follower value, indicating that resolution of the desired torque change through the cruise throttle follower would take it beyond the current engine throttle follower value, the desired engine torque change is not provided for through IAC motor movement, but rather is provided through movement of the cruise control actuator, by moving directly to the described step 228, to set the cruise motor move flag without an update of the throttle follower commands over their prior values. Returning to step 216, if cztf does not exceed TF, the IAC motor cruise control throttle follower is used to provide for the desired change in engine output torque by moving to a next step 218, to compute the desired engine IAC motor position as the sum of the current position IACPOS and the desired position change represented by ΔIAC. If the computed IAC exceeds the maximum realizable IAC motor or valve position at a next step 220, the IAC has insufficient authority to resolve the desired engine output torque change and the compensation is then provided by the cruise control actuator by moving to the described step 228, to set the cruise motor move flag. Returning to step 220, if IAC does not exceed MAXIAC, a next step 222 is executed to clear the integrator sum to prepare for the next iteration of the routine of FIGS. 4a, 4b, and 5, and the cruise throttle follower output command CRUZTFCMD is next, at a step 224, set to the determined value cztf, to provide for IAC resolution of the desired change in engine output torque. Next, the cruise motor move flag is cleared at a step 226 to prevent parallel actuation of the cruise motor with the IAC motor, to reduce the potential controllability and stability problems associated with high gain parallel engine intake air control when both actuators are actively varying the amount of engine intake air, in accord with an aspect of this invention.

Returning to the step 206, if ΔTORQ is not greater than zero, the cruise throttle follower command is determined as the current command CRUZTFCMD minus the current desired change in IAC position ΔIAC. Next, cztf is compared to the engine throttle follower value TF at a step 210. If cztf exceeds or is equal to TF, the IAC motor is to be used to provide for the desired engine output torque change by next carrying out the described steps 222–226. However, if cztf is less than TF at the step 210, the cruise control actuator alone will provide desired change in engine output torque, as cruise control throttle follower operation will drive the cruise control throttle follower past the engine throttle follower position, increasing the potential for disruption to other ongoing control processes that may rely on or use throttle follower functions, by proceeding directly to the described step 228 to enable cruise actuator (motor) motion, as described.

Accordingly, through the steps 206–228, cruise control stability and controllability gains are provided through a responsive control approach When cruise control throttle follower has authority to resolve a desired change in engine output torque on its own, it may do so if doing so will draw it nearer the conventional engine throttle follower position value. Otherwise, the torque change will be provided through intake air valve 14 (FIG. 1) movement under the influence of the cruise control actuator. The cruise control throttle follower will then be drawn nearer the engine throttle follower. Eventually, there will be no difference between the position resolved by the two throttle follower functions, minimizing the impact of the cruise control functions of the present embodiment to other engine control and diagnostic activities that may rely on the conventional engine throttle follower function, and minimizing the magnitude of any engine output torque fluctuations.

Figure 6:
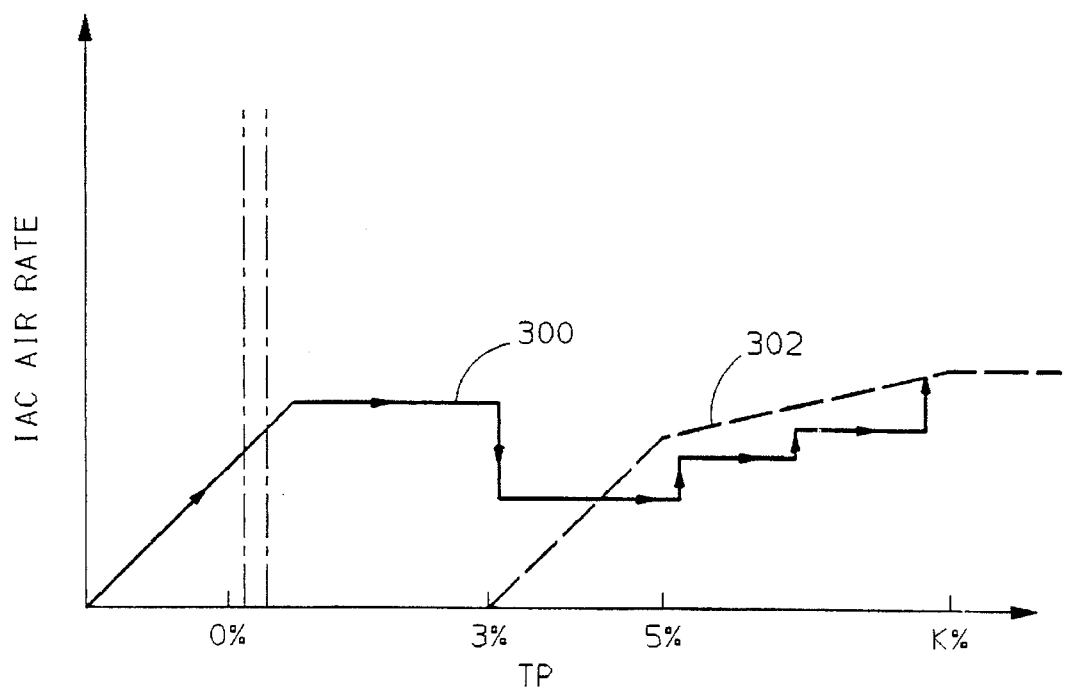
FIGS. 6 and 7 are diagrams illustrating typical calibration relationships between inlet air rate past the idle air control valve of FIG. 1 and signal TPS of FIG. 1 for increasing and decreasing TPS magnitude, respectively, in accord with the preferred embodiment.
Figure 7:
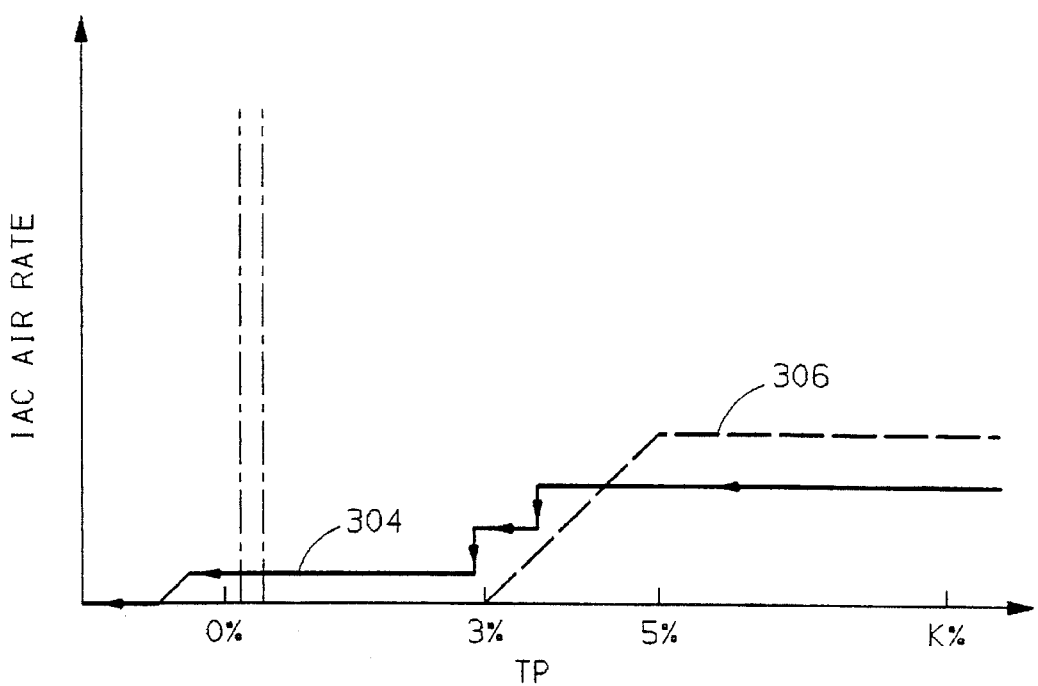

FIGS. 6 and 7 illustrate the function of the cruise control throttle follower along with the conventional engine throttle follower. Specifically, curve 300 of FIG. 6 illustrates motion of the cruise throttle follower with increasing intake air valve 14 (FIG. 1) position for an opening intake air valve scenario. For TP below or slightly above zero, the intake air valve and the IAC (through the cruise control throttle follower function) will increase together to take up and compensate for cruise control mechanical lash. After the lash is taken up (at a TP of slightly grater than zero), the cruise throttle follower is limited as shown in curve 300 while the cruise control actuator responds to a vehicle speed error. The curve 302 represents motion of the conventional engine throttle follower function with increasing TP as is generally understood in the art. Above about 5% TP, the cruise throttle follower begins to track the conventional TF value, without exceeding or crossing it, to minimize disruption to other engine control processes, as described. Finally, slightly below K% TP, cruise throttle follower reaches the conventional throttle follower.

FIG. 7 illustrates cruise and conventional throttle follower activities for a decreasing TP scenario. The conventional throttle follower illustrated as curve 306 draws to a rapid albeit controlled close starting at about 5% TP at which time the cruise throttle follower has not yet begun to closely track it. Accordingly, the cruise throttle follower of curve 304 begins to track the conventional throttle follower without crossing or advancing beyond it, to minimize control disruption, as described. After the conventional throttle follower is reduced to zero, the cruise throttle follower may remain at a value slightly greater than zero. When the TP is reduced to a value below zero, the cruise throttle follower then gradually and controllably is reduced to zero along with the cruise actuator, as described.

After clearing the cruise motor move flag at the step 226, the described step 252 is provided to return to the routine of FIG. 4b, to determine if the cruise motor move flag is set at a next step 164. If the flag is set, a cruise motor move command is generated at a next step 166 as a function of the integrator sum and the current sensed or estimated vehicle battery voltage Vbat. The cruise motor move command may be referenced at the step 166 from a conventional lookup table stored in read only memory of controller 34 (FIG. 1) and developed through a conventional calibration process as the amount of cruise motor movement corresponding to a desired engine output torque change. If the command is determined, at a next step 168, to be greater than zero, corresponding to a command that will draw the intake air valve in an opening direction of motion, a next step 170 determines whether a maximum torque has been realized by the cruise control actuator, such as by comparing the current intake air valve position TP to a position threshold of about 60% of its maximum position, above which an insubstantial increase in engine output torque may be yielded by a further opening of the intake air valve. The position threshold may be computed as a function of engine speed or load, through a conventional calibration process, during which process the change in engine output torque may be measured and, for each of a plurality of engine speeds or loads, the intake air valve position above which no significant increase in engine output torque is available is stored in read only memory of the controller 34 (FIG. 1). If, for the current engine speed or load, the desired engine intake air valve position to be provided through the cruise move command exceeds the stored intake air valve position corresponding to the maximum engine output torque, the command is not applied by moving to the described step 160 at which the cruise move command is cleared. Returning to step 170, if the cruise move command does not exceed the maximum torque position, or if the cruise move command was less than or equal to zero at the step 168, a step 172 is executed to clear the integrator sum to prepare for the next iteration of the routine of FIGS. 4a and 4b, as the cruise control actuator or the IAC motor position changes provided for through the routine of FIGS. 4a, 4b, and 5 already has addressed the current integrator sum. Next, or following the described step 160, a step 174 is executed to store the cruise motor move command, such as in controller random access memory, where the command may be referenced through conventional cruise control operations when the command is to be output to the cruise actuator driver 38 of FIG. 12 or to the IAC motor driver 24 of FIG. 1, as is generally understood in the art. Next, a step 176 is executed to return to any operations that were temporarily suspended to provide for execution of the described operations of FIGS. 4 and 5.

The preferred embodiment for the purpose of explaining this invention is not to be taken as limiting or restricting this invention since many modifications may be made through the exercise of ordinary skill in the art without departing from the scope of the invention.

The embodiments of the invention in which a property or privilege is claimed are described as follows:

1. In an automotive vehicle internal combustion engine receiving intake air through an intake air bore in which is disposed an intake air valve and through a bypass passage in which is disposed a bypass valve, the engine having a cruise control actuator mechanically linked to the intake air valve so that movement of the cruise control actuator results in proportionate movement of the intake air valve when the engine is operating within a predetermined operating region, a cruise control method for varying engine output torque to control vehicle speed, comprising the steps of:

establishing a cruise set speed;

sensing actual vehicle speed;

calculating speed error as the difference between the cruise set speed and the actual vehicle speed;

generating a desired torque change as a predetermined function of the calculated speed error as the amount of change in engine output torque needed to substantially reduce the speed error;

determining whether the engine is currently operating within the predetermined operating region; and when the engine is not determined to be operating within the predetermined operating region, then (a) calculating a cruise control actuator position change command as a predetermined function of the desired torque change, (b) calculating a bypass valve position change command as a predetermined function of the desired torque change, (c) varying the position of the cruise control actuator in accord with the calculated cruise control actuator position change command and varying the position of the bypass valve in accord with the calculated bypass valve position change command to provide the desired torque change.

2. The method of claim 1, further comprising the step of:

when the engine is determined to be operating within the predetermined operating region, then varying the position of a predetermined one of the cruise control actuator and the bypass valve in accord with a predetermined function of the desired torque change to provide the desired torque change.

3. The method of claim 1, further comprising the steps of:

when the engine is determined to be operating within the predetermined operating region, then (a) sensing actual intake air valve position, (b) determining a throttle follower bypass valve position as a predetermined function of the sensed actual intake air valve position, (c) generating a bypass valve position change command as the change in bypass valve position needed to provide the desired change in engine output torque, (d) determining whether the generated bypass valve position change command will move the bypass valve position toward the throttle follower bypass valve position, (e) varying the position of the bypass valve in accord with the generated bypass valve position change command if it is determined that the bypass valve position change command will move the bypass valve position toward the throttle follower bypass valve position.

4. The method of claim 3, further comprising, when the engine is determined to be operating within the predetermined operating region, the step of:

varying the position of the cruise control actuator in accord with a predetermined function of the desired torque change if it is determined that the bypass valve position change command will not move the bypass valve position toward the throttle follower bypass valve position.

5. The method of claim 1, the engine further comprising a deceleration fuel cutoff function for reducing engine fueling under predetermined deceleration conditions, the method further comprising the steps of:

comparing vehicle speed error to a predetermined speed error range; and disabling the deceleration fuel cutoff function if vehicle speed error is within the predetermined speed error range.

6. The method of claim 1, the engine further comprising a deceleration fuel cutoff function for reducing engine fueling under predetermined deceleration conditions, the method further comprising the step of:

disabling the deceleration fuel cutoff function while the bypass valve position is varied in accord with the calculated bypass valve position change command.

7. The method of claim 1, the engine further comprising a deceleration fuel cutoff function for reducing engine fueling under predetermined deceleration conditions, the method further comprising the steps of:

comparing the calculated speed error to a predetermined speed error range; and delaying activation of the deceleration fuel cutoff function if the calculated speed error is within the predetermined speed error range.

8. In an automotive vehicle internal combustion engine having a main intake air path in which is disposed a throttle valve and having a secondary intake air path substantially independent of the main intake air path in which is disposed a bypass valve, the engine having a cruise control actuator mechanically linked to the throttle valve so that the cruise control actuator and the throttle valve move substantially together when the engine is operating within a predetermined operating region, a cruise control method for varying engine output torque to control vehicle speed, comprising the steps of:

establishing a cruise set speed;

sensing actual vehicle speed;

calculating speed error as the difference between the cruise set speed and the actual vehicle speed;

generating a desired change in engine output torque as a predetermined function of the calculated speed error, as the amount of change in engine output torque needed to substantially reduce the speed error;

determining whether the engine is currently operating within the predetermined operating region;

when the engine is not determined to be currently operating within the predetermined operating region, controlling the position of both the throttle valve and the bypass valve to vary engine intake air rate to provide the desired change in engine output torque; and when the engine is determined to be currently operating within the predetermined operating region, controlling the position of a predetermined one of the throttle valve and the bypass valve to vary engine intake air rate to provide the desired change in engine output torque.

9. The method of claim 8, wherein the step of controlling the position when the engine is determined to be currently operating within the predetermined operating region further comprises the steps of:

calculating a bypass valve position change command as the bypass valve position change required to provide the desired change in engine output torque;

determining a present throttle valve position; generating a bypass valve throttle follower position as a predetermined function of the present throttle valve position;

determining if application of the calculated bypass valve position change command to the bypass valve would drive the bypass valve position toward the generated bypass valve throttle follower position;

controlling the position of the bypass valve in accord with the calculated bypass valve position change command to provide the desired change in engine output torque if it is determined that application of the calculated bypass valve position change command to the bypass valve would drive the bypass valve position toward the generated bypass valve throttle follower position; and if it is determined that application of the calculated bypass valve position change command to the bypass valve would not drive the bypass valve position toward the generated bypass valve throttle follower position, then (a) generating a throttle valve position change command as a predetermined function of the desired change in engine output torque, and (b) controlling the position of the throttle valve in accord with the throttle valve position change command to provide the desired change in engine output torque.

10. The method of claim 8, the engine further comprising a deceleration fuel cutoff function for reducing engine fueling under predetermined deceleration conditions, the method further comprising the steps of:

comparing the calculated speed error to a predetermined speed error range; and disabling the deceleration fuel cutoff function if the calculated speed error is within the predetermined speed error range.

11. The method of claim 8, the engine further comprising a deceleration fuel cutoff function for reducing engine fueling under predetermined deceleration conditions, the method further comprising the step of:

disabling the deceleration fuel cutoff function while the bypass valve position is controlled to vary engine intake air rate to provide the desired change in engine output torque.

12. In an automotive vehicle internal combustion engine cruise control system having a cruise control actuator mechanically linked to a throttle valve such that the throttle valve position changes in proportion to change in position of the cruise control actuator while the engine is within a predetermined operating range in which substantially no mechanical lash is present between the cruise control actuator and the throttle valve and such that the throttle valve position does not significantly change as the cruise control actuator position changes while the engine is within a low throttle operating range in which significant mechanical lash is present between the cruise control actuator and the throttle valve, the engine further comprising an intake air bypass passage in which is disposed a bypass valve, a cruise control method for controlling engine intake air to drive vehicle speed toward an operator set speed, comprising the steps of:

determining actual vehicle speed;

generating a speed error as the difference between the operator set speed and the actual vehicle speed;

determining a desired engine output torque change to drive the speed error toward zero;

sampling an input signal indicating the current engine operating condition;

determining whether the current engine operating condition indicated by the sampled input signal is within the low throttle operating range; and if the current engine operating condition is within the low throttle operating range, then (a) calculating a cruise control actuator position change command as a predetermined function of the desired engine output torque change, (b) calculating a bypass valve position change command as a predetermined function of the desired engine output torque change, (c) varying the position of the cruise control actuator and of the bypass valve in accord with the calculated cruise control actuator position change command and the calculated bypass valve position change command, respectively, to control engine intake air while reducing the mechanical lash.

13. The method of claim 12, further comprising the steps of:

determining whether the current engine operating condition indicated by the sampled input signal is within the predetermined engine operating range;

if the current engine operating condition is within the predetermined engine operating range, then (a) determining a change in cruise control actuator position needed to provide the desired change in engine output torque, (b) determining a change in bypass valve position needed to provide the desired change in engine output torque, (c) varying a predetermined one of the cruise control actuator position and the bypass valve position in accord with the determined change in cruise control actuator position and the determined change in bypass valve position, respectively, to provide the desired change in engine output torque.

14. The method of claim 13, further comprising, if the current engine operating condition is within the predetermined engine operating range, the steps of:

sensing actual throttle valve position;

generating a bypass valve throttle follower position as a predetermined function of the sensed actual throttle valve position; and establishing whether application of the determined change in bypass valve position to the bypass valve would move the position of the bypass valve closer to and not beyond the bypass valve throttle follower position, and wherein the varied predetermined one is the cruise control actuator position if it is established that application of the determined change would move the bypass valve position closer to and not beyond the bypass valve throttle follower position.

15. The method of claim 14, wherein the varied predetermined one is the bypass valve position if it is established that application of the determined change would not move the bypass valve position closer to the bypass valve throttle follower position or would move the bypass valve position beyond the bypass valve throttle follower position.

16. The method of claim 12, the engine further comprising a deceleration fuel cutoff function for reducing engine fueling under predetermined deceleration conditions, the method further comprising the steps of:

comparing the speed error to a predetermined speed error range; and disabling the deceleration fuel cutoff function if the speed error is within the predetermined speed error range.

17. The method of claim 12, the engine further comprising a deceleration fuel cutoff function for reducing engine fueling under predetermined deceleration conditions, the method further comprising the step of:

disabling the deceleration fuel cutoff function while the bypass valve position is varied in accord with the calculated bypass valve position change command.

* * * * *